(12) United States Patent
Skillman (10) Patent No.: US 6,351,277 B1
(45) Date of Patent: Feb. 26, 2002

(54) DIRECT DIGITAL SYNTHESIS PIXEL CLOCK GENERATOR

(75) Inventor: Gary R. Skillman, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/680,193

(22) Filed: Oct. 6, 2000

(51) Int. Cl.[7] .................................................. B41J 2/435
(52) U.S. Cl. ....................................... 347/235; 347/250
(58) Field of Search .................................. 347/234, 235, 347/237, 247, 248, 250; 327/12; 341/143; 708/271, 301; 375/354, 362, 376

(56) References Cited

U.S. PATENT DOCUMENTS

| | | | |
|---|---|---|---|
| 5,212,570 A | 5/1993 | Nacman | 358/481 |
| 5,477,330 A | 12/1995 | Dorr | 358/296 |
| 5,517,230 A | 5/1996 | Lofthus et al. | 347/235 |
| 5,651,017 A | 7/1997 | Genovese | 372/38.02 |

OTHER PUBLICATIONS

The Technique of Direct Programming by Using a Two–Modulus Prescaler, Motorola Semiconducor Technical Data, AN827/D, Motorola, Inc. 1995.

Primary Examiner—Hai C. Pham
(74) Attorney, Agent, or Firm—John M. Kelly; David E Henn (57) ABSTRACT

A Direct Digital Synthesis pixel clock generator for use in electrophotographic printers. A controller receives a start-of-scan signal and a facet 0 signal. In response, the controller sends a pre-stored frequency control word to a Direct Digital Synthesis Oscillator. The Direct Digital Synthesis Oscillator sends pulses at a frequency that depends on the frequency control word to a Digital Phase Shift Circuit. The controller also applies a sequence of delay profile words to the Digital Phase Shift Circuit. Each delay profile word causes the Digital Phase Shift Circuit to delay a contemporaneous pulse from the Direct Digital Synthesis Oscillator between 0° and 360° degrees, with the actual delay depending upon the delay profile word. The delay profile words are selected such that scan line pixels are "adjusted" in position. A phase-locked-loop circuit integrates and smoothes the frequency step changes. The output of the phase-locked loop circuit is applied to a synchronizer that synchronizes the pixel clocks with the start-of-scan. Alternatively, the controller applies a sequence of frequency profile words to a Direct Digital Synthesis Oscillator. The Direct Digital Synthesis Oscillator then generates pulses at a rate that depends upon the applied frequency profile word. The frequency profile words are selected such that the pixels are "adjusted" in position. A phase-locked-loop circuit then integrates and smoothes the output of the Direct Digital Synthesis Oscillator. The resulting pulse frequency is applied to a synchronizing circuit that synchronizes the pixel clocks with the start-of scan-signals.

12 Claims, 6 Drawing Sheets

DIRECT DIGITAL SYNTHESIS PIXEL CLOCK GENERATOR

FIELD OF THE INVENTION

This invention relates to variable frequency oscillators used in imaging assemblies of electrophotographic printing machines.

BACKGROUND OF THE PRESENT INVENTION

Electrophotographic marking is a well-known, commonly used method of copying or printing documents. Electrophotographic marking is performed by exposing a charged photoreceptor with a light image representation of a desired document. The photoreceptor is discharged in response to that light image, creating an electrostatic latent image of the desired document on the photoreceptor's surface. Toner particles are then deposited onto that latent image, forming a toner image, which is then transferred onto a substrate, such as a sheet of paper. The transferred toner image is then fused to the substrate, usually using heat and/or pressure, thereby creating a permanent record of the original representation. The surface of the photoreceptor is then cleaned of residual developing material and recharged in preparation for the production of other images.

The foregoing broadly describes a black and white electrophotographic printing machine. Electrophotographic marking can also produce color images by repeating the above process once for each color of toner that is used to make the composite color image. For example, in one color process, referred to herein as the REaD IOI process (Recharge, Expose, and Develop, Image On Image), a charged photoreceptive surface is exposed to a light image which represents a first color, say black. The resulting electrostatic latent image is then developed with black toner particles to produce a black toner image. The charge, expose, and develop process is repeated for a second color, say yellow, then for a third color, say magenta, and finally for a fourth color, say cyan. The various color images, and thus the various colors of toner particles, are placed in superimposed registration such that a desired composite color image results. That composite color image is then transferred and fused onto a substrate.

The REaD IOI process can be performed in various ways. For example, in a single pass printer wherein the composite image is produced in a single cycle of the photoreceptor. This requires a charging, an exposing, and a developing station for each color of toner. Single pass printers are advantageous in that they are relatively fast since a composite color image can be produced in one cycle of the photoreceptor. However, they are relatively expensive since multiple charging, exposing, and developing stations are required. An alternative process is to have the photoreceptor make multiple passes through the printer. During a first process the photoreceptor is exposed to produce a latent image for a first color (black) and that latent image is developed for that first color. During a second pass the exposure station exposes the photoreceptor to produce a latent image for a second color (yellow), and then that latent image is developed for second first color. The process continues for the third and fourth colors. In a multiple pass printer only one charging station and only one exposure station is required.

One way of exposing the photoreceptor is to use a Raster Output Scanner (ROS). A ROS is typically comprised of a laser source (or sources), a pre-polygon optical system, a rotating polygon having a plurality of mirrored facets, and a post-polygon optical system. In a simplified description of operation a collimated light beam is reflected from facets of an optical polygon and passes through imaging elements that project it into a finely focused spot of light on the photoreceptor surface. As the polygon rotates, the focused spot traces a path on the photoreceptor surface referred to as a scan line. By moving the photoreceptor as the polygon rotates the laser spot raster scans the surface of the photoreceptor. By modulating the laser beam with image information a predetermined latent image is produced on the photoreceptor.

Figure 1:
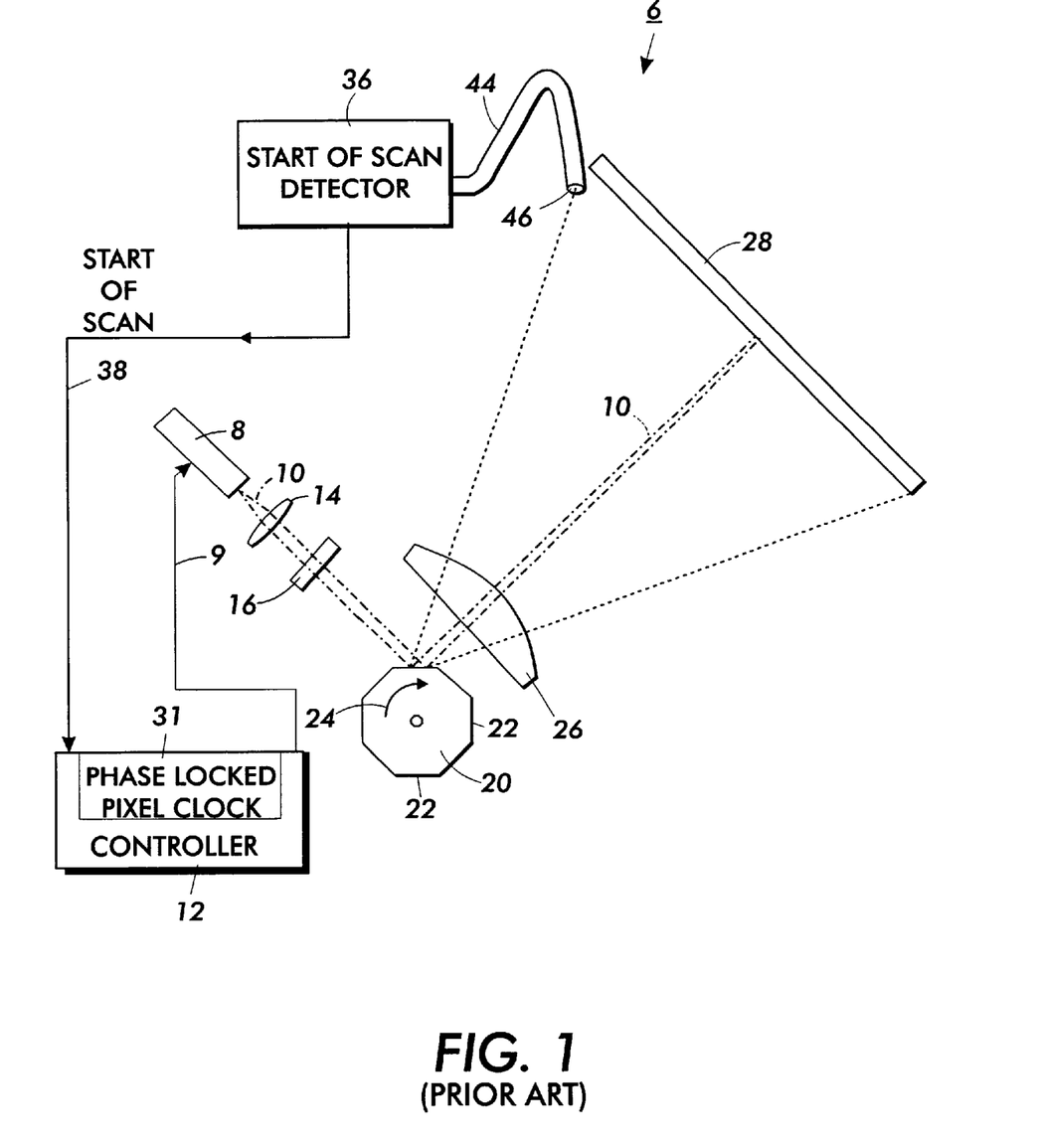
FIG. 1 schematically illustrates a prior art imaging system having a phase-locked pixel clock.

Exposing the photoreceptor requires elements in addition to the basic raster output scanner described above. FIG. 1 illustrates a typical prior art imaging assembly 6 for exposing a photoreceptor. That assembly includes a laser diode 8 that emits a laser beam 10 that is modulated in response to drive signals from a controller 12 that are applied to the laser diode via a line 9. As emitted the laser beam 10 is divergent. A lens 14 collimates that diverging beam and directs the collimated beam through a cylindrical lens 16 that has focusing power only in the sagittal direction. After passing through the cylindrical lens 16 the laser beam is incident on a polygon 20 that includes a plurality of mirrored facets 22. The polygon is rotated at a constant rotational velocity by a motor (not shown) in a direction 24. The mirrored facets deflect the laser beam as the polygon rotates, resulting in a sweeping laser beam. A post-scan optical system 26 focuses the laser beam 10 to form a spot of circular or elliptic cross sectional shape on a moving photoreceptor 28. The post-scan optical system 26 is typically an F-theta lens design intended to correct for scan line nonlinearity (see below). In FIG. 1, the direction of photoreceptor motion would be into (or out of) the view plane. By properly modulating the laser beam 10 as the focused spot sweeps across the photoreceptor a desired latent image is produced. That latent image is comprised of multiple scan lines, each of which is comprised of a plurality of image elements referred to as pixels.

The imaging assembly of FIG. 1 also includes a start of scan detector 36. The start-of-scan detector 36 incorporates a fiber-optic element 44 that guides light received at its input end 46, which is in the scanning plane of the raster output scanner, to a photosensitive element (not shown). In response to a received light pulse produced by the sweeping scan line, the start-of-scan detector produces the start of scan signal on a line 38. That signal causes the raster output scanner to synchronize the laser diode modulation such that each scan line starts at the same distance from the edge of the photoreceptor 28.

In a single pass color printer there are four imaging assemblies. Ideally the four imaging assemblies produce geometrically straight scan lines having evenly spaced, identically sized pixels that result in scan lines of identical lengths which start at the same relative position on the photoreceptor. However, obtaining such scan lines from multiple imaging assemblies is very difficult. For example, manufacturing tolerances in producing and assembling exposure stations result in scan lines that, unless corrected, are shorter or longer than ideal. Other errors include, but are not limited to the following:

1. Changes in scan velocity during the scan. Given a uniform rotational velocity of the raster polygon, the ends of the scan line are scanned at a faster rate then at the center of the scan line (assuming that the polygon is centered on the photoreceptor). This is known as scan line non-linearity. It has the effect of displacing image information along the scan line from its desired location. While the F-theta post-scan optical system 26 reduces scan line nonlinearity, in a typical system non-linearity errors of +2 pixels are common.

2. Facet to facet jitter. Each facet of the polygon may have slight imperfections that cause the laser beam to have shorter or longer flight times compared to the other facets. In a typical system, with the scan lines synchronized by the Start-of-Scan signal, the ends of the scan lines receive the full effect of the facet to facet imperfections. In a typical imaging assembly errors of +½ pixels are common.

3. Misalignment of an imaging assembly with the photoreceptor. This causes the scan line length to vary and also produces scan line nonlinearities. While scan line nonlinearities can be improved by changing the average frequency of the pixel clock, known as Magnification Correction, there remains a residual error known as Keystoning that can add +1 pixels of non-linearity to the scan.

Without correction the foregoing errors result in color mis-registration and color distortion. Scan lines that are longer or shorter than ideal are akin to fast scan direction magnification errors. In the prior art, such magnification errors were compensated for using a variable frequency pixel clock. If the pixel clock frequency for each imaging assembly is properly adjusted it is possible to compensate for magnification errors such that each scan line has substantially the same length and such that the pixel spacing is relatively uniform.

In the prior art imaging assembly of FIG. 1 the controller 12 includes a variable frequency phase-locked pixel clock 31. The pixel clock is beneficially controlled such that the scan lines are linear and have lengths that are substantially close to ideal. While variable frequency phase-locked pixel clocks can successfully correct relatively large errors, they have less success correcting for small errors or for making fine scan line length adjustments. This is partially because correcting small errors requires difficult-to-achieve small pixel clock frequency adjustments. Unfortunately, correcting small errors in the scan line is important for high quality color imaging. Therefore, a new imaging assembly having a variable frequency pixel clock that is capable of small frequency adjustments would be beneficial. Even more beneficial would be a new electrophotographic printer having imaging assemblies that include a variable frequency pixel clock that is capable of small, rapid frequency adjustments such that the resulting scan lines are linear and have lengths that are of a predetermined length.

SUMMARY OF THE PRESENT INVENTION

The principles of the present invention provide for a Direct Digital Synthesis pixel clock generator for use in imaging assemblies of electrophotographic printers. Imaging assemblies that incorporate such generators can produce linear scan lines. Furthermore, such imaging assemblies are particularly beneficial when multiple scan line images produced by multiple imaging assemblies must be carefully registered.

A first Direct Digital Synthesis pixel clock generator includes a controller that receives a start-of-scan signal and a facet 0 signal. In response the controller sends a prestored frequency control word to a Direct Digital Synthesis Oscillator. The Direct Digital Synthesis Oscillator begins sends pulses, at a frequency that depends on the frequency control word, to a Digital Phase Shift Circuit. The controller also applies a sequence of delay profile words to the Digital Phase Shift Circuit. Each delay profile word causes the Digital Phase Shift Circuit to delay a contemporaneous pulse from the Direct Digital Synthesis Oscillator between 0° and 360° degrees, with the actual delay depending upon the delay profile word. A sequence of delay profile words exist for each facet, with one word for each pixel. The delay profile words are selected such that the pixels that make up each scan line are "adjusted" in position such that the resulting scan line is comprised of linearly spaced pixels. The delayed pulses are applied to a phase-locked-loop circuit that multiplies its input frequency by N, where N is an integer. The phase-locked-loop circuit integrates and smoothes the frequency step changes. The output of the phase-locked loop circuit is then applied to a synchronizer that synchronizes the pixel clocks with the start-of-scan such that the pixels clocks start each scan line at the proper location.

An alternative Direct Digital Synthesis pixel clock generator includes a controller that receives a start-of-scan signal and a facet 0 signal. Based on those signals the controller applies a sequence of frequency profile words to a Direct Digital Synthesis Oscillator. A sequence of frequency profile words exist for each facet, with one word for each pixel. In turn, the Direct Digital Synthesis Oscillator generates pulses at a rate that depends upon the applied frequency profile word. Each frequency profile word is selected such that the pixel that corresponds to that frequency profile word is "adjusted" in position such that the resulting scan line is comprised of linearly spaced pixels. The output of the Direct Digital Synthesis Oscillator is applied to a phase-locked-loop circuit that multiplies its input frequency by N, where N is an integer. The phase-locked circuit has integrates and smoothes the frequency step changes from by the Direct Digital Synthesis Oscillator. The resulting pulse frequency is applied to a synchronizing circuit that synchronizes the pixel clocks with the start-of-scan such that the pixels clocks start each scan line at the proper location.

BRIEF DESCRIPTION OF THE DRAWINGS

For a general understanding of the features of the present invention, reference is made to the drawings, wherein like reference numerals have been used throughout to designate identical elements, in which.

DETAILED DESCRIPTION OF THE PRESENT INVENTION

Figure 2:
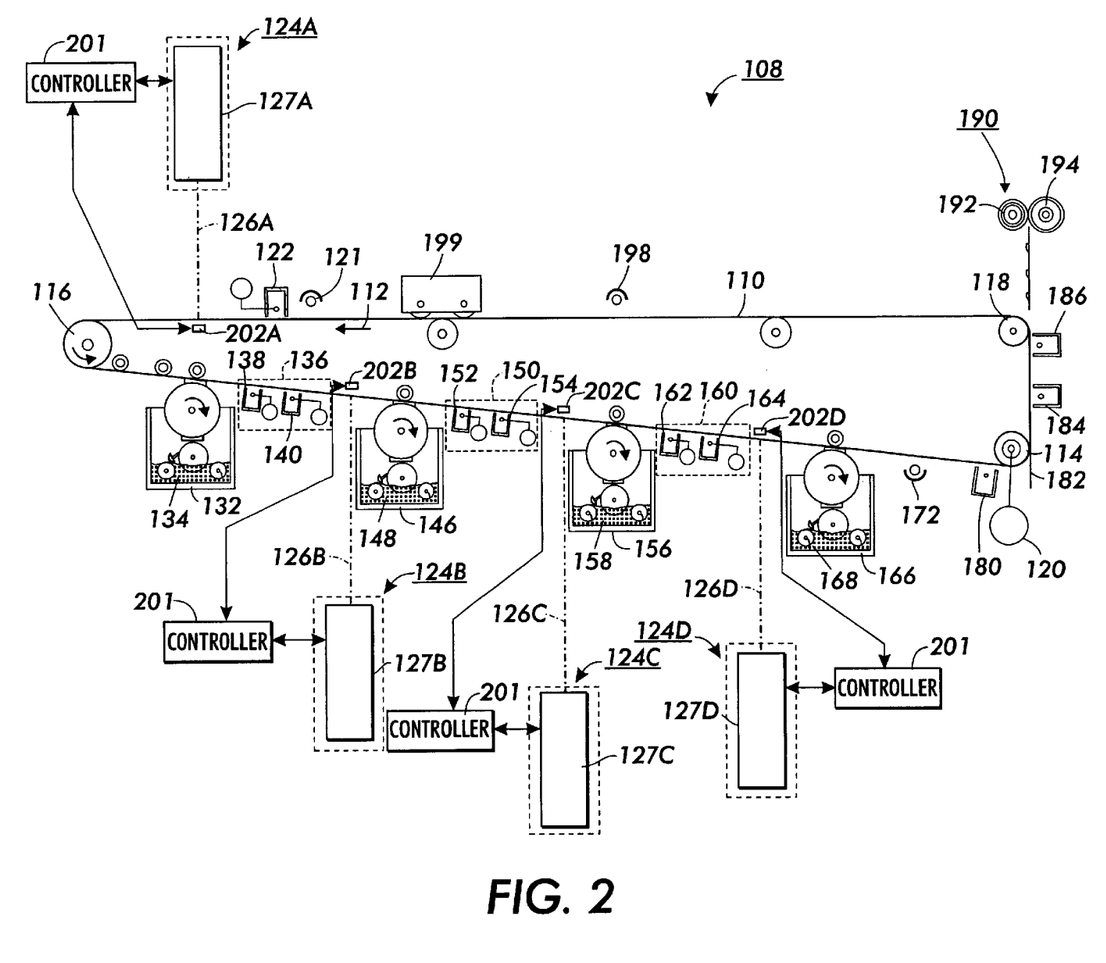
FIG. 2 schematically illustrates a single pass color electrophotographic printer that includes exposure stations that incorporate the principles of the present invention.

FIG. 2 illustrates a single pass, Recharge-Expose-and-Develop, Image-on-Image (Read IOI) color printer 108 that is in accord with the principles of the present invention.

However, it is to be understood that the present invention is applicable to many other machines. Therefore, it is to be understood that the following description of the color printer 108 is only to assist the understanding of the principles of the present invention.

The color printer 108 includes a photoreceptor belt 110 which travels in the direction indicated by the arrow 112. Belt travel is brought about by mounting the photoreceptor belt about a driven roller 114 and about tension rollers 116 and 118, and then driving the driven roller 114 with a motor 120.

As the photoreceptor belt travels each part of it passes through each of the subsequently described process stations. For convenience, a single section of the photoreceptor belt, referred to as the image area, is identified. The image area is that part of the photoreceptor belt which is to receive the various actions and toner layers that produce the final composite color image. While the photoreceptor belt may have numerous image areas, since each image area is processed in the same way a description of the processing of one image area suffices to explain the operation of the color printer 108.

The imaging process begins with the image area passing a "precharge" erase lamp 121 that illuminates the image area so as to cause any residual charge which might exist on the image area to be discharged. Such erase lamps are common in high quality systems and their use for initial erasure is well known. As the photoreceptor belt continues its travel the image area passes a charging station comprised of a corotron 122. The corotron charges the image area in preparation for exposure to create a latent image for black toner. For example, the corotron might charge the image area to a substantially uniform potential of about −500 volts. It should be understood that the actual charge placed on the photoreceptor will depend upon many variables, such as the black toner mass that is to be developed and the settings of the black development station (see below).

After passing the charging station the image area advances to an exposure station 124A. At the exposure station the charged image area is exposed to a modulated laser beam 126A from a raster output scanner 127A that raster scans the image area such that an electrostatic latent representation of a black image is produced. The exposure station 124A produces a linear scan line that begins at a predetermined position on the photoreceptor and that has a predetermined scan line length. A more detailed description of the exposure station is given subsequently.

Still referring to FIG. 2, after passing the exposure station 124A the exposed image area with the black latent image passes a black development station 132 that advances black toner 134 onto the image area so as to develop a black toner image. Biasing is such as to effect discharged area development (DAD) of the lower (less negative) of the two voltage levels on the image area. The charged black toner 134 adheres to the illuminated parts of the image area. The voltage of the illuminated parts of the image area is about −200 volts. The non-illuminated parts of the image area remain at about −500 volts.

After passing the black development station 132 the image area advances to a recharging station 136 comprised of a DC corotron 138 and an AC scorotron 140. The recharging station 136 recharges the image area and its black toner layer using a technique known as split recharging. Briefly, the DC corotron 138 overcharges the image area to a voltage level greater than that desired when the image area is recharged, while the AC scorotron 140 reduces that voltage level to that which is desired. Split recharging serves to substantially eliminate voltage differences between toned areas and untoned areas and to reduce the level of residual charge remaining on the previously toned areas.

The recharged image area with its black toner layer then advances to an exposure station 124B. There, a laser beam 126B from a raster output scanner 127B exposes the image area to produce an electrostatic latent representation of a yellow image. In the same manner (described subsequently) as the exposure station 124A, the position, length, and linearity of the scan line on the photoreceptor is determined and controlled. Furthermore, laser beam 126B is modulated such that the yellow latent image is in superimposed registration with the black latent image.

The now re-exposed image area then advances to a yellow development station 146 that deposits yellow toner 148 onto the image area. After passing the yellow development station the image area advances to a recharging station 150 where a DC scorotron 152 and an AC scorotron 154 split recharge the image area.

An exposure station 124C then exposes the recharged image area. A modulated laser beam 126C from a raster output scanner 127C exposes the image area to produce an electrostatic latent representation of a magenta image. In the same manner (described subsequently) as the exposure stations 124A and 124B, the position and the length of the scan line on the photoreceptor is determined and controlled. Furthermore, the laser beam 126C is modulated such that the magenta latent image is in superimposed registration with the black and yellow latent images.

After passing the magenta exposure station the now re-exposed image area advances to a magenta development station 156 that deposits magenta toner 158 onto the image area. After passing the magenta development station the image area advances another recharging station 160 where a DC corotron 162 and an AC scorotron 164 split recharge the image area.

The recharged image area with its toner layers then advances to an exposure station 124D. There, a laser beam 126D from a raster output scanner 127D exposes the image area to produce an electrostatic latent representation of a cyan image. In the same manner (described subsequently) as the exposure stations 124A, 124B, and 124C, the position and the length of the scan line on the photoreceptor is determined and controlled. Furthermore, the laser beam 126D is modulated such that the cyan latent image is in superimposed registration with the black, yellow, and magenta latent images.

After passing the exposure station 124D the re-exposed image area advances past a cyan development station 166 that deposits cyan toner 168 onto the image area. At this time four colors of toner are on the image area, resulting in a composite color image. However, the composite color toner image is comprised of individual toner particles that have charge potentials that vary widely. Directly transferring such a composite toner image onto a substrate would result in a degraded final image. Therefore it is beneficial to prepare the composite color toner image for transfer.

To prepare for transfer a pretransfer erase lamp 172 discharges the image area to produce a relatively low charge level on the image area. The image area then passes a pretransfer DC scorotron 180 that performs a pre-transfer charging function. The image area continues to advance in the direction 112 past the driven roller 114. A substrate 182 is then placed over the image area using a sheet feeder (which is not shown). As the image area and substrate continue their travel they pass a transfer corotron 184 that applies positive ions onto the back of the substrate 182. Those ions attract the negatively charged toner particles onto the substrate.

As the substrate continues its travel it passes a detack corotron 186. That corotron neutralizes some of the charge on the substrate to assist separation of the substrate from the photoreceptor 110. As the leading edge of the substrate 182 moves around the tension roller 118 the substrate's lip separates from the photoreceptor. The substrate is then directed into a fuser 190 where a heated fuser roller 192 and a pressure roller 194 create a nip through which the substrate 182 passes. The combination of pressure and heat at the nip causes the composite color toner image to fuse into the substrate. After fusing, a chute, not shown, guides the substrate to a catch tray, also not shown, for removal by an operator.

After the substrate 182 is separated from the photoreceptor belt 110 the image area continues its travel and passes a preclean erase lamp 198. That lamp neutralizes most of the charge remaining on the photoreceptor belt. After passing the preclean erase lamp the residual toner and/or debris on the photoreceptor is removed at a cleaning station 199. The image area then passes once again to the precharge erase lamp 121 and the start of another printing cycle.

In addition to the elements described above, the printer 108 also includes a system controller 201 (shown in four places in FIG. 1) that controls the overall operation of the printer. The system controller preferably comprises one or more programmable microprocessors that operate in accordance with a software program stored in a suitable memory. Of particular importance to understanding the present invention is that the system controller synchronizes the overall operation the printer 108 and provides video information that modulates the laser beams 126A–126D. Finally, FIG. 1 also illustrates four start-of-scan detectors, 202A, 202B, 202C, and 202D, that detects the start of scan of the laser beams 126A, 126B, 126C, and 126D, respectively.

Figure 3:
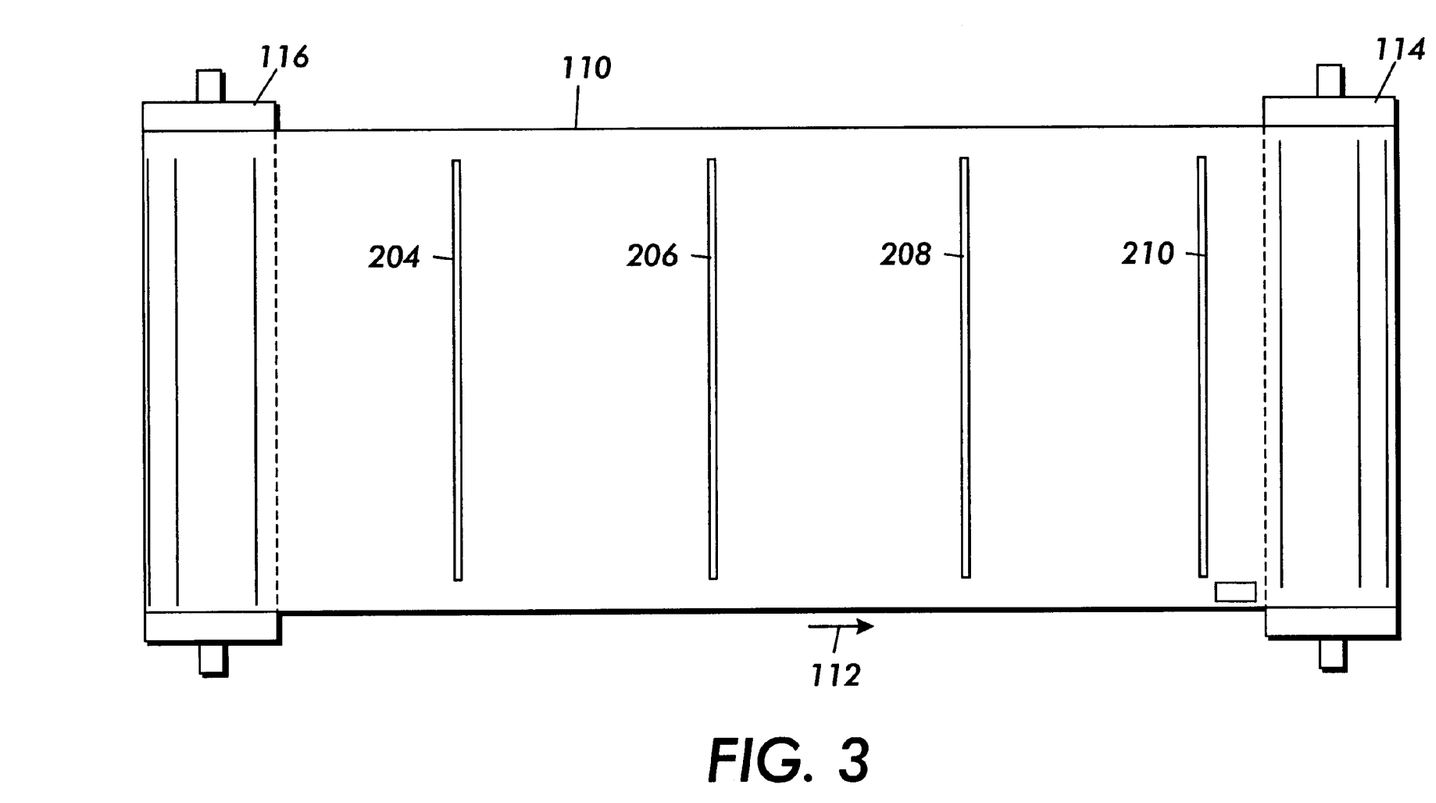
FIG. 3 schematically illustrates a bottom's up view of the electrophotographic printing machine shown in FIG. 2, but without the raster output scanners.

FIG. 3 helps explain the overall goal of the principles of the present invention. That goal is the production of individual scan lines from each of the raster output scanners that are linear, have substantially the same length, and that start at the same relative location on the photoreceptor 110. If that is achieved the individual signal color images are carefully registered. FIG. 3 shows four scan line, the scan lines 204, 206, 208, and 210, that are produced by the exposure stations 124A, 124B, 124C, and 124D, respectively. For example, the printer 108 prints at 600 spots per inch and each of the scan lines has a length that is within 0.4 pixels of nominal. Thus, after each scan line produces a single color image, and after those color images are properly registered, the resulting composite color image has a high color quality.

Figure 4:
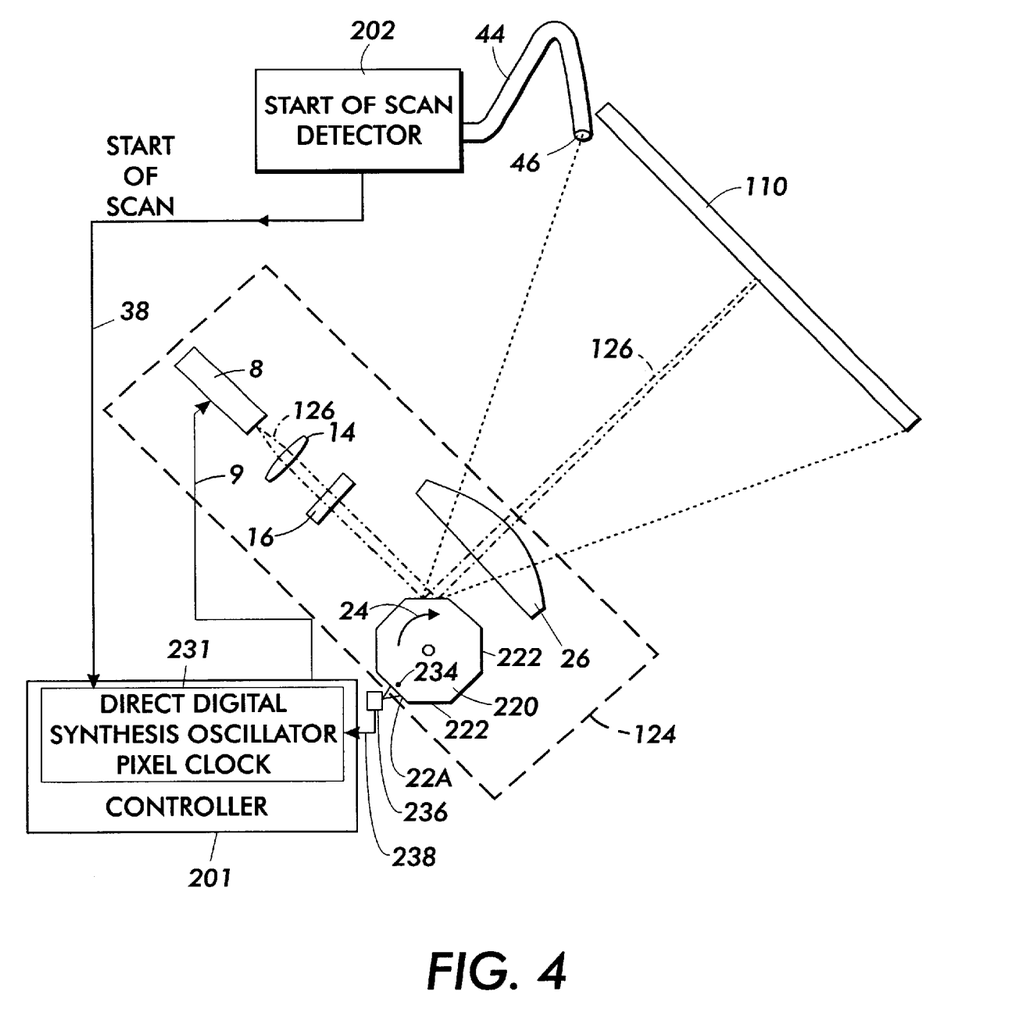
FIG. 4 schematically illustrates an imaging system having a pixel clock that is in accord with the principles of the present invention.

FIG. 4 schematically illustrates an imaging assembly that includes an exposure station 124, which is a generic representation of the exposure stations 124A–124D. This imaging assembly is similar to the imaging assembly 6 of FIG. 1. Changes include a Digital Synthesis pixel clock generator 231 in a controller 201 instead of the phase-locked pixel clock 31 of controller 12, a mark 234 on the polygon, an optical sensor 236, and a renumbering of several elements to correspond to FIG. 2. In FIG. 4, a laser diode 8 produces a laser beam 126 that illuminates the photoreceptor 110. The laser beam 126 is modulated in accordance with image information applied to the laser diode 8 via a line 9 from the controller 201. A lens 14 collimates the laser beam 126 and directs the collimated beam through a cylindrical lens 16 that has focusing power only in the sagittal direction. After passing through the cylindrical lens 16 the laser beam 126 is incident on a polygon 220 that includes a plurality of mirrored facets 222. The polygon is rotated at a constant rotational velocity by a motor (not shown) in a direction 24. The mirrored facets deflect the laser beam 126 as the polygon rotates, resulting in a sweeping laser beam. The polygon 220 includes the mark 234, which is suitable for sensing by an optical sensor. The mark 234 designates one of the mirrored facets, facet 222A, as facet 0. A post-scan optical system 26 focuses the laser beam 126 to form a spot of circular or elliptic cross sectional shape on the moving photoreceptor 110.

Located proximate the polygon 220 is the optical sensor 236. That sensor senses the mark 234 and sends a facet 0 signal on a line 238 to the controller 201 when facet 222A is in position to be imaged. The imaging assembly further includes a start-of-scan detector 202 that incorporates a fiber-optic element 44 that guides light received at its input end 46, which is in the scanning plane of the raster output scanner, to a photosensitive element (not shown). In response the start-of-scan detector produces the start of scan signal on a line 38. That signal causes the raster output scanner to begin imaging the scan line on the photoreceptor. By using the facet 0 signal to sense when facet 222A is being imaged, and by using the start-of-scan signals to determine when subsequent facets are being imaged, the controller 201 can determine which of the facets 222 (relative to facet 222A) will be producing a scan line.

Figure 5:
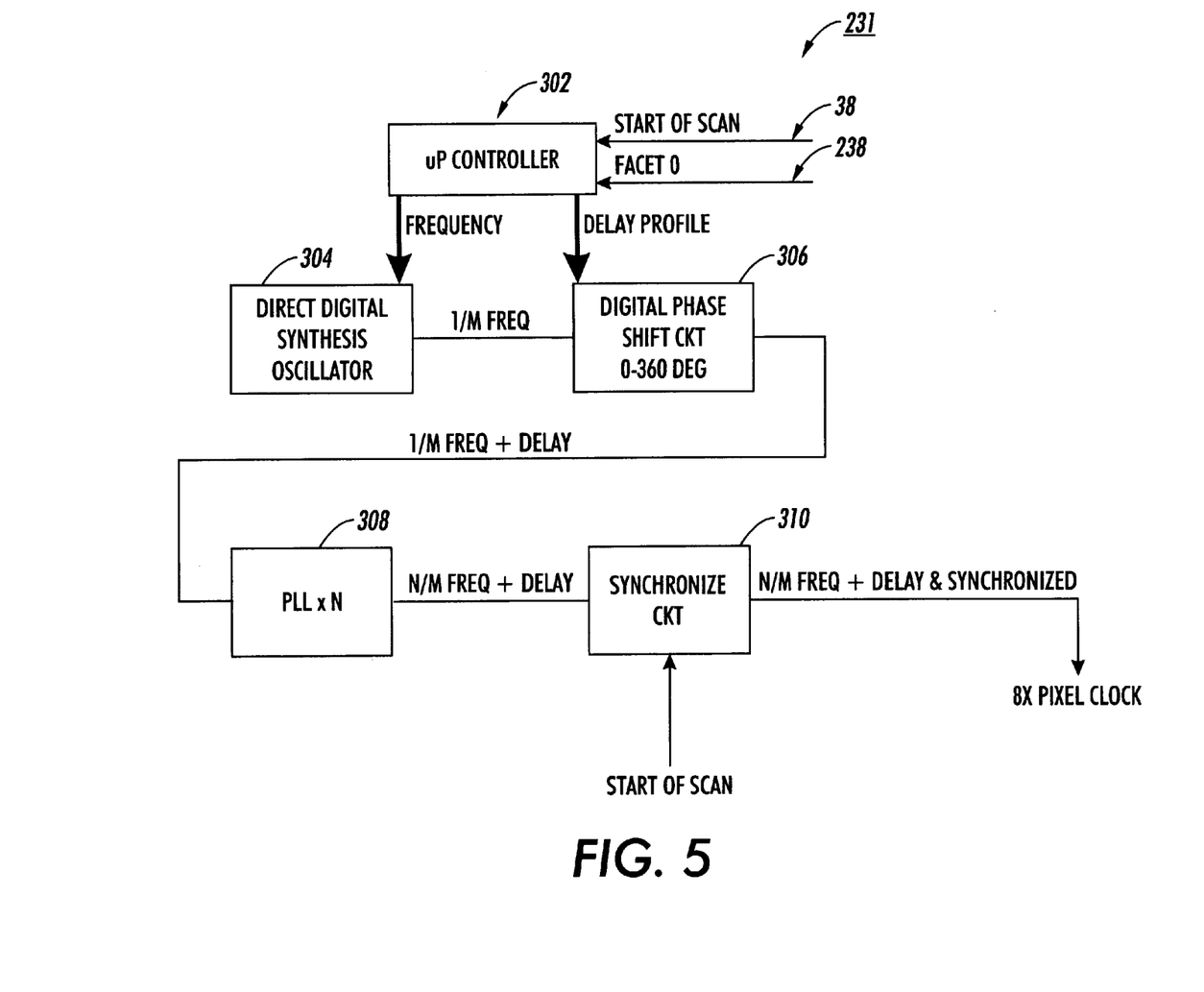
FIG. 5 schematically illustrates a block diagram of a first version pixel clock used in the imaging system of FIG. 4.

FIG. 5 illustrates the special Direct Digital Synthesis pixel clock generator 231 in more detail. That pixel clock generator includes a microcontroller 302 that receives the start-of-scan signal on line 38 and the facet 0 signal on line 238. Based on those inputs the microcontroller applies a pre-stored frequency control word to a Direct Digital Synthesis Oscillator 304. Such oscillators are well known in the art, reference, for example, AD9832 from Analog Devices. The frequency control word is selected to produce a frequency of Pixel Frequency/M, where M is an integer. M is chosen so that the output of the Direct Digital Synthesis circuit has a reasonably small amount of harmonics. For the AD9832, this typically means that output frequency should be less than about 30% of its reference frequency.

The output of the Direct Digital Synthesis Oscillator 304 is applied to a Digital Phase Shift Circuit 306. Additionally, the microcontroller 302 applies a sequence of delay profile words to the Digital Phase Shift Circuit 306. Each delay profile word causes the Digital Phase Shift Circuit to delay the contemporary signal from the Direct Digital Synthesis Oscillator 304 between 0 and 360 degrees, with the actual delay depending upon the delay profile word. Sequences of delay profile words are stored in the microcontroller, one sequence for each facet, and one word for each pixel. Each delay profile word is selected such that the pixel that corresponds to that delay profile word is "adjusted" in position such that the resulting scan line is linear. Such adjustments are dependent on the specific characteristics of the raster output scanner 124. Therefore, the delay profile word for each facet is best determined by measurement of uncorrected scan lines. Measurement of the amount of non-linearity may be done either on an optical bench test set-up or in situ in the machine of interest.

The output of the Digital Phase Shift Circuit 306 is applied to a phase-locked-loop circuit 308 that multiplies the input frequency by N, where N is an integer. The resulting frequency is then used in a high addressability system. As an example of a high addressability system the clock rate may want to be 8 times the basic pixel rate. For this system, N is chosen such that the following equation is true:

8X PIXEL CLOCK=BASE PIXEL FREQUENCY×(N/M)

Figure 6:
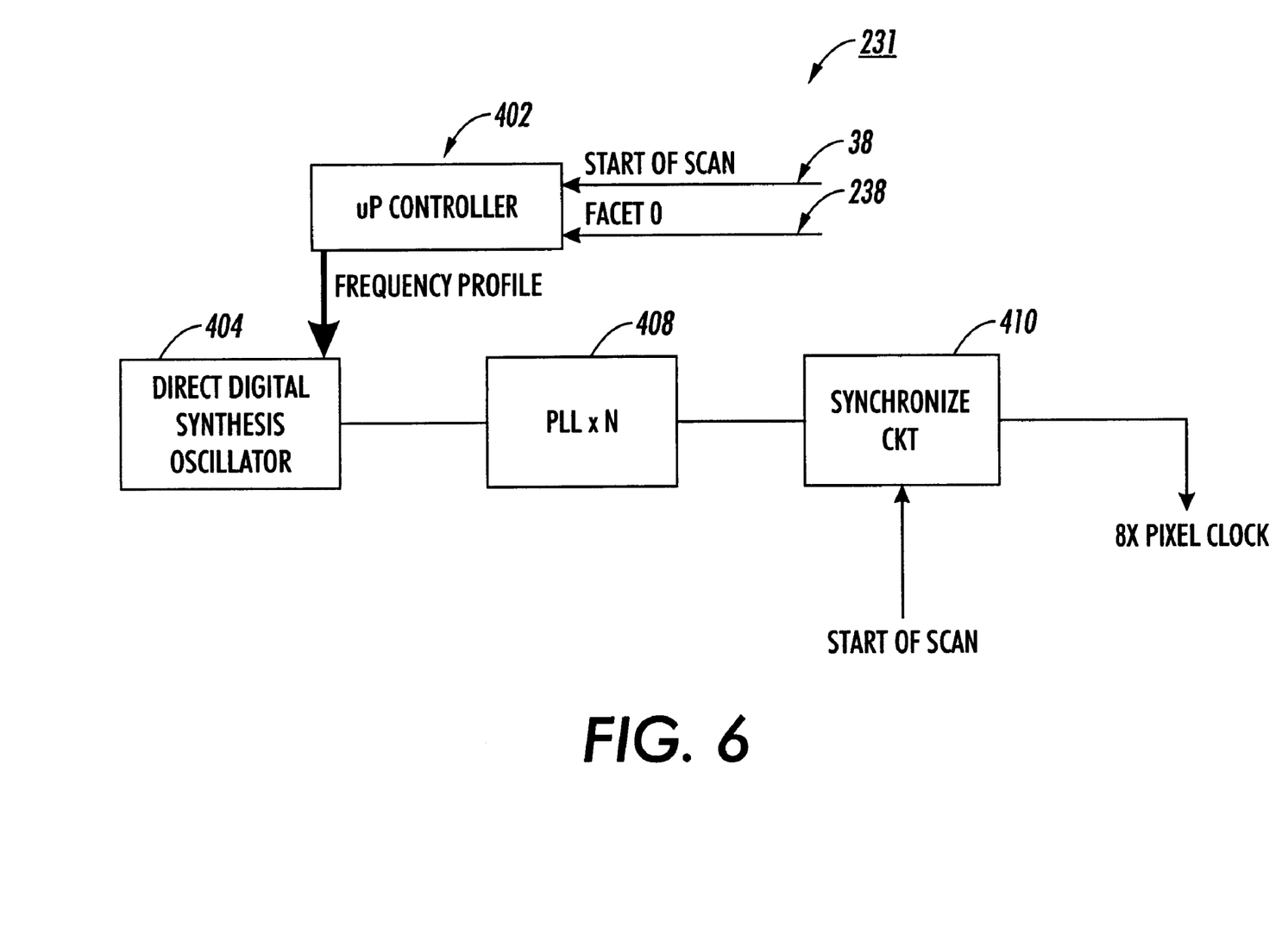
FIG. 6 schematically illustrates a block diagram of an alternative version pixel clock used in the imaging system of FIG. 4.

FIG. 6 illustrates an alternative Direct Digital Synthesis pixel clock generator 231 in more detail. That pixel clock generator again includes a microcontroller 402 that receives the start-of-scan signal on line 38 and the facet 0 signal on the line 238. Based on those inputs, the microcontroller applies a sequence of frequency profile words to a Direct Digital Synthesis Oscillator 404. Sequences of frequency profile words are stored in the microcontroller, one sequence for each facet, and one word for each pixel in a scan line for that facet. In turn, the Direct Digital Synthesis Oscillator 404 generates pulses at a rate that depends upon the applied frequency profile word. Each frequency profile word is selected such that the pixel that corresponds to that frequency profile word is "adjusted" in position such that the resulting scan line is linear. Such adjustments are dependent on the specific characteristics of the raster output scanner 124 and on the characteristics of the Direct Digital Synthesis Oscillator. Therefore, the sequence of frequency profile words for each facet is best determined by measurements of uncorrected scan lines.

The output of the Direct Digital Synthesis Oscillator 404 is applied to a phase-locked-loop circuit 408 that multiplies the input frequency by N, where N is an integer. The resulting frequency is then used in a high addressability system. As an example of a high addressability system the clock rate may want to be 8 times the basic pixel rate. For this system, N is chosen such that the following equation is true:

8X PIXEL CLOCK=BASE PIXEL FREQUENCY×(N/M)

While this invention has been described in conjunction with a specific embodiment, it is evident that many alternatives, modifications and variations will be apparent to those skilled in the art. Accordingly, the present invention is intended to embrace all alternatives, modifications, and variations that fall within the spirit and scope of the claims.

What is claimed is:

1. An imaging station for scanning a laser beam across an imaging member so as to form a plurality of scan lines, the imaging station including:
    a laser diode for producing a laser beam;
    a rotating, multifaceted polygon for receiving said laser beam and for sweeping said laser beam in a scan line plane across a surface so as to form a scan line, said polygon further including an indicia that designates one of said facets;
    a facet detector for sensing said indicia, said facet detector producing a facet 0 signal when said designated one facet is in position to trace a scan line;
    a modulator for modulating said laser diode with video information, wherein said modulation is synchronized with pixel clocks, and wherein said modulation starts after a start-of-scan signal;
    a start-of-scan detector for sensing said sweeping laser beam and for producing said start of scan (SOS) signal; and
    a Direct Digital Synthesis pixel clock generator for producing pixel clocks, said Direct Digital Synthesis pixel clock generator comprising:
        a controller that receives said start-of-scan signal and said facet 0 signal, said controller producing a frequency control word and a sequence of delay profile words, wherein said frequency control word and said sequence of delay profile words depend upon said facet 0 signal and said start-of-scan signal;
        a Direct Digital Synthesis Oscillator that produces frequency pulses at a frequency that depends on said frequency control word;
        a Digital Phase Shift Circuit the receives said frequency pulses and that delays each frequency pulse an amount that depends upon a delay profile word of said sequence of delay profile words; and
        a phase-locked-loop circuit smoothes the frequency step changes of said delayed frequency pulses so as to produce said pixel clocks.

2. The imaging station according to claim 1, wherein said phase-locked-loop circuit multiplies its input frequency by N, where N is an integer.

3. The imaging station according to claim 1, further including a synchronizer for synchronizing said pixel clocks with said start-of-scan signal.

4. An imaging station for scanning a laser beam across an imaging member so as to form a plurality of scan lines, the imaging station including:
    a laser diode for producing a laser beam;
    a rotating, multifaceted polygon for receiving said laser beam and for sweeping said laser beam in a scan line plane across a surface so as to form a scan line, said polygon further including an indicia that designates one of said facets;
    a facet detector for sensing said indicia, said facet detector producing a facet 0 signal when said designated one facet is in position to trace a scan line;
    a modulator for modulating said laser diode with video information, wherein said modulation is synchronized with pixel clocks, and wherein said modulation starts after a start-of-scan signal;
    a start-of-scan detector for sensing said sweeping laser beam and for producing said start of scan (SOS) signal; and
    a Direct Digital Synthesis pixel clock generator for producing pixel clocks, said Direct Digital Synthesis pixel clock generator comprising:
        a controller that receives a start-of-scan signal and a facet 0 signal, said controller producing a sequence of frequency profile words, wherein said frequency profile words depends upon said facet 0 signal and said start-of-scan signal;
        a Direct Digital Synthesis Oscillator that produces frequency pulses at a frequency that depends on a contemporaneous frequency control word; and
        a phase-locked-loop circuit smoothes the frequency step changes of said frequency pulses so as to produce pixel clocks.

5. The imaging station according to claim 4, wherein said phase-locked-loop circuit multiplies its input frequency by N, where N is an integer.

6. The imaging station according to claim 4, further including a synchronizer for synchronizing said pixel clocks with said start-of-scan signal.

7. A marking machine, comprising:
    a moving, charged photoreceptor;
    an imaging station for scanning a laser beam across said charged photoreceptor so as to form a latent image comprised of a plurality of scan lines, the imaging station including:
        a laser diode for producing said laser beam;

a rotating, multifaceted polygon for receiving said laser beam and for sweeping said laser beam in a scan line plane across said charged photoreceptor so as to form a scan line, said polygon further including an indicia that designates one of said facets;

a facet detector for sensing said indicia, said facet detector producing a facet 0 signal when said designated one facet is in position to trace a scan line;

a modulator for modulating said laser diode with video information, wherein said modulation is synchronized with pixel clocks, and wherein said modulation starts after a start-of-scan signal;

a start-of-scan detector for sensing said sweeping laser beam and for producing said start of scan (SOS) signal; and a Direct Digital Synthesis pixel clock generator for producing pixel clocks, said Direct Digital Synthesis pixel clock generator comprising:

a controller that receives said start-of-scan signal and said facet 0 signal, said controller producing a frequency control word and a sequence of delay profile words, wherein said frequency control word and said sequence of delay profile words depend upon said facet 0 signal and said start-of-scan signal;

a Direct Digital Synthesis Oscillator that produces frequency pulses at a frequency that depends on said frequency control word;

a Digital Phase Shift Circuit the receives said frequency pulses and that delays each frequency pulse an amount that depends upon a delay profile word of said sequence of delay profile words; and a phase-locked-loop circuit smoothes the frequency step changes of said delayed frequency pulses so as to produce said pixel clocks.

8. The imaging station according to claim 7, wherein said phase-locked-loop circuit multiplies its input frequency by N, where N is an integer.

9. The imaging station according to claim 7, further including a synchronizer for synchronizing said pixel clocks with said start-of-scan signal.

10. A marking machine, comprising:

a moving, charged photoreceptor;

an imaging station for scanning a laser beam across said charged photoreceptor so as to form a latent image comprised of a plurality of scan lines, the imaging station including:

a laser diode for producing said laser beam;

a rotating, multifaceted polygon for receiving said laser beam and for sweeping said laser beam in a scan line plane across said charged photoreceptor so as to form a scan line, said polygon further including an indicia that designates one of said facets;

a facet detector for sensing said indicia, said facet detector producing a facet0signal when said designated one facet is in position to trace a scan line;

a modulator for modulating said laser diode with video information, wherein said modulation is synchronized with pixel clocks, and wherein said modulation starts after a start-of-scan signal;

a start-of-scan detector for sensing said sweeping laser beam and for producing said start of scan (SOS) signal; and a Direct Digital Synthesis pixel clock generator for producing pixel clocks, said Direct Digital Synthesis pixel clock generator comprising:

a controller that receives a start-of-scan signal and a facet 0 signal, said controller producing a sequence of frequency profile words, wherein said frequency profile words depends upon said facet 0 signal and said start-of-scan signal;

a Direct Digital Synthesis Oscillator that produces frequency pulses at a frequency that depends on a contemporaneous frequency control word; and a phase-locked-loop circuit smoothes the frequency step changes of said frequency pulses so as to produce pixel clocks.

11. The imaging station according to claim 10, wherein said phase-locked-loop circuit multiplies its input frequency by N, where N is an integer.

12. The imaging station according to claim 10, further including a synchronizer for synchronizing said pixel clocks with said start-of-scan signal.

* * * * *